United States Patent [19]

Danielson et al.

[11] Patent Number: 5,023,410

[45] Date of Patent: Jun. 11, 1991

[54] CORD REEL CONTACTS FOR A VACUUM CLEANER

[75] Inventors: Orland H. Danielson, Boyle County; Joseph R. Gross, City of Danville, both of Ky.

[73] Assignee: Whirlpool Corporation, Benton Harbor, Mich.

[21] Appl. No.: 459,650

[22] Filed: Jan. 2, 1990

[51] Int. Cl.⁵ .......................................... H02G 11/02
[52] U.S. Cl. ............................. 191/12.20 R; 191/12.4; 242/107; 15/323
[58] Field of Search .................. 191/12.2 R, 12.4; 15/323; 242/107, 107.6, 107.7

[56] References Cited

U.S. PATENT DOCUMENTS

| | | |
|---|---|---|
| 1,636,587 | 7/1927 | Buddendorf. |
| 1,693,884 | 12/1928 | Biessman ............................ 191/12.4 |
| 2,246,863 | 6/1941 | Smellie ............................ 191/12.2 R |
| 2,416,498 | 2/1947 | Ruddock ......................... 191/12.2 R |
| 2,591,214 | 4/1952 | Tamarin ......................... 191/12.2 R |
| 3,029,462 | 4/1962 | Tamarin ......................... 191/12.2 R |
| 3,137,883 | 6/1964 | Descarries ....................... 191/12.2 R |
| 3,929,210 | 12/1975 | Cutler et al. ................... 191/12.2 R |
| 4,542,858 | 9/1985 | Manges .......................... 191/12.2 R |
| 4,713,497 | 12/1987 | Smith ............................. 191/12.2 R |

Primary Examiner—Frank E. Werner
Assistant Examiner—Brian K. Dinicola
Attorney, Agent, or Firm—Wood, Phillips, Mason, Recktenwald & Vansanten

[57] ABSTRACT

A vacuum cleaner cord reel assembly includes a pair of axially spaced contact disks in electrical contact with contact terminals for providing a rotational connection between a cord reel and the vacuum cleaner. The contact disks are mounted to a hub which rotatively mounts the cord reel and are permitted to float thereon so that the disk assembly can realign itself regardless of cord reel chassis displacement.

21 Claims, 4 Drawing Sheets

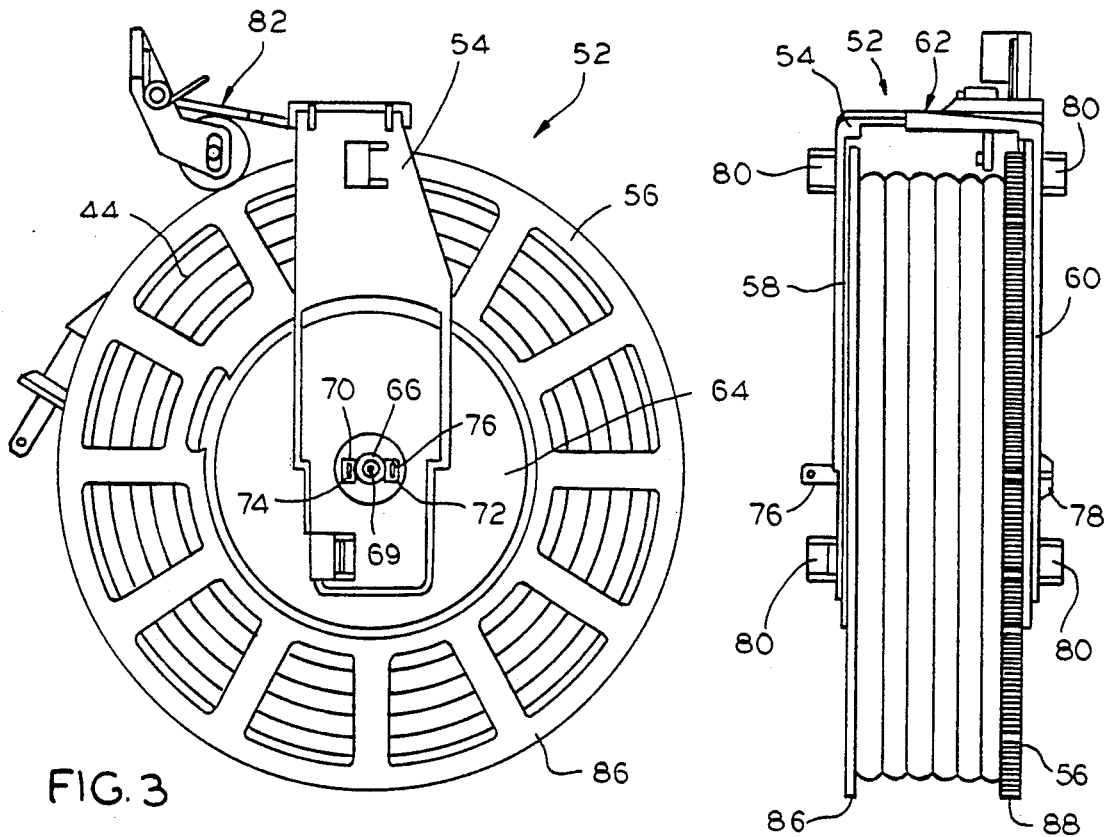
FIG. 3
FIG. 4
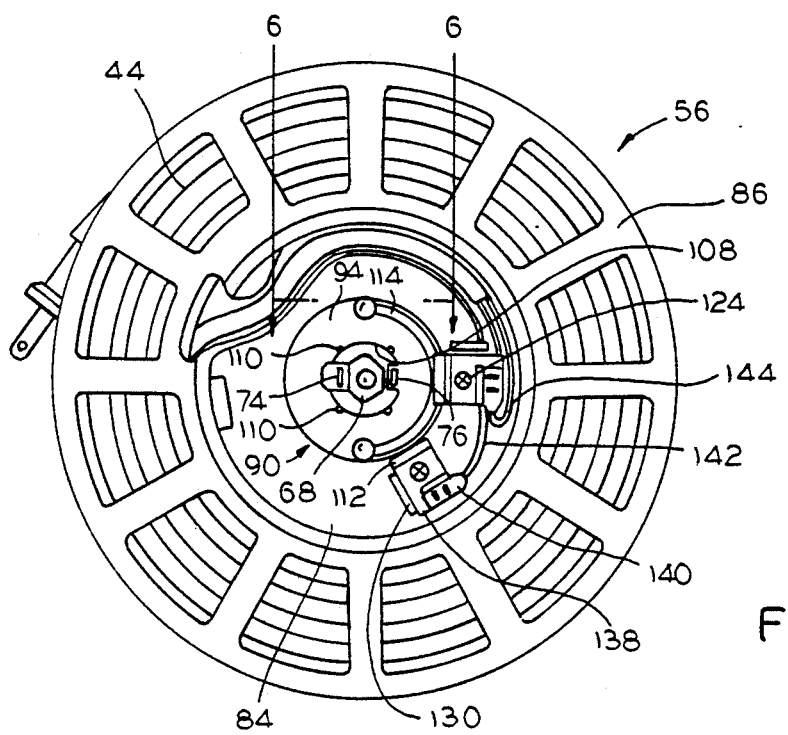
FIG. 5

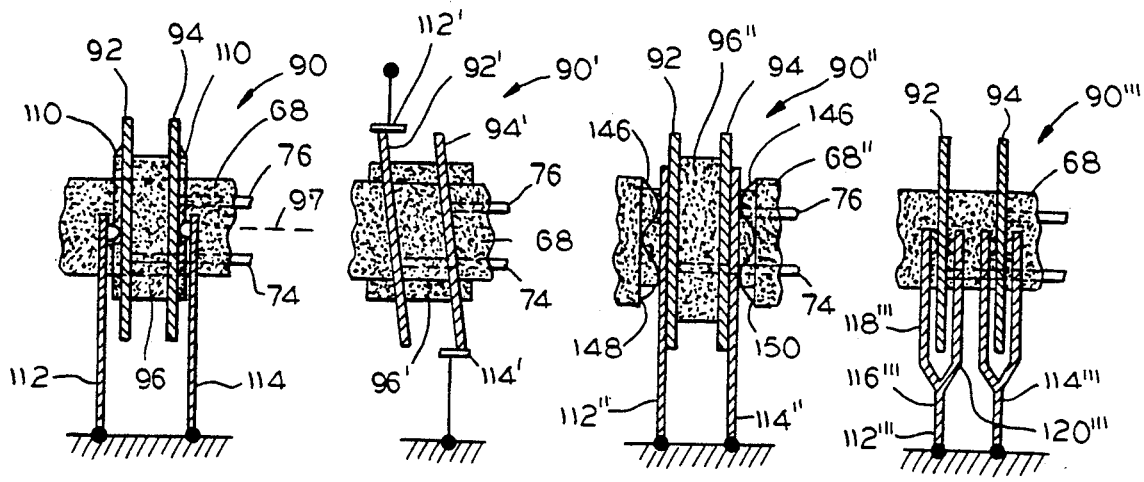
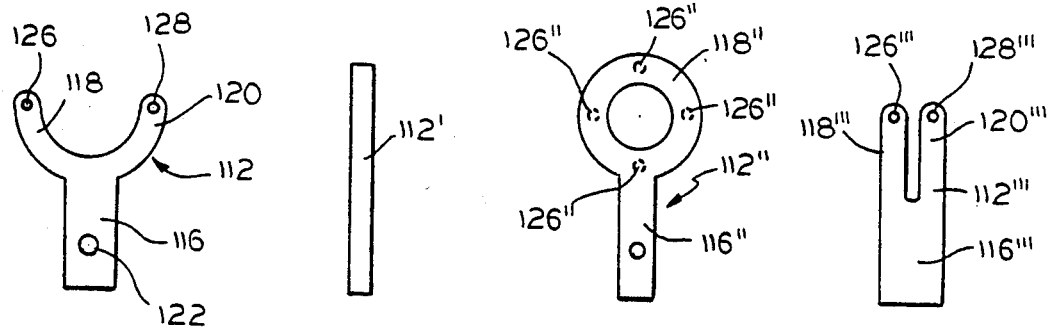
FIG.6  FIG.8  FIG.10  FIG.12
FIG.7  FIG.9  FIG.11  FIG.13
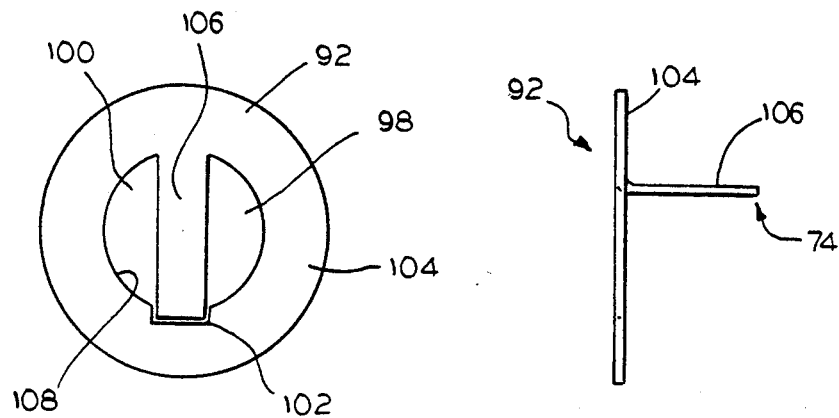
FIG.14  FIG.15

CORD REEL CONTACTS FOR A VACUUM CLEANER

FIELD OF THE INVENTION

This invention relates to vacuum cleaners and, more particularly, to a cord reel assembly for a vacuum cleaner.

BACKGROUND OF THE INVENTION

An electrically operated vacuum cleaner utilizes an electric motor driven apparatus for providing suction. The motor is powered through an electric power cord. In some instances the power cord is wound about a vacuum cleaner handle by the user. Alternatively, a self-winding cord reel is used to store the power cord.

With a cord reel, it is necessary to provide an electrical connection between the cord, which is rotating on the reel, and the fixed motor. A rotary electrical connection must therefore be used. One known form for such a rotary electrical connection comprises two co-planar conductive rings carried by the reel and a pair of contact elements carried by a fixed reel support bracket. As the reel rotates, electrical contact is made between the contact elements and the rings. Such a construction is illustrated in Tamarin U.S. Pat. No. 2,591,214.

Certain, more recent vacuum cleaners utilize higher amperage motors. Therefore, it is desirable that the contacts provide for greater convective and conductive heat dissipation. Also, it is desirable to minimize contact bounce which might occur as a result of relative movement between the reel and the reel support bracket.

The present invention is intended to overcome one or more of the problems as set forth above, in a novel and simple manner.

SUMMARY OF THE INVENTION

In accordance with the invention, a cord reel assembly for a vacuum cleaner is provided with a floating pair of parallel contact disks.

Broadly, there is disclosed herein a vacuum cleaner cord reel assembly comprising a support bracket fixedly mounted in a vacuum cleaner housing. A cord reel is rotatably supported on the support bracket about a rotational axis and carries a two conductor electrical cord wound thereon for supplying power to the vacuum cleaner. First and second planar conductive elements include output terminals for connection to electrical apparatus in the housing. Means are provided for mounting the conductive elements to the support bracket in axially spaced relationship with one another. First and second contact terminals are electrically connected to the two conductors. Means are provided for fixedly securing the contact terminals to the cord reel so that the first and second contact terminals are in electrical contact with the first and second conductive elements, respectively, incident to the cord reel being supported on the support bracket, to deliver power therebetween.

According to one aspect of the invention the conductive elements are parallel to one another.

In one form of the invention the conductive elements are perpendicular to the rotational axis.

In another form of the invention the conductive elements are non-perpendicular to the rotational axis.

In accordance with another aspect of the invention each contact terminal includes two contact pads in electrical contact with its respective conductive element. Further, in accordance with such aspect, the contact terminal is radially offset relative to its respective conducting element to provide two concentric contact paths thereon.

In accordance with a further aspect of the invention the support bracket rotatably supports the cord reel on a hub and the mounting means comprises an insulating spacer disposed between the conductive elements on the hub.

In one form of the invention the conductive elements comprise circular disks.

In another form of the invention the conductive elements comprise an annular disk including an outwardly bent terminal tab defining the output terminal.

In accordance with one embodiment of the invention the contact terminal contacts a peripheral edge surface of its respective conductive element.

In accordance with a further embodiment of the invention the contact terminal contacts a planar surface of its respective conductive element.

In accordance with yet another embodiment of the invention the contact terminal contacts two planar surfaces of its respective conductive element.

According to still a further aspect of the invention the mounting means resiliently mount the conductive elements to the support bracket.

According to yet a further aspect of the invention the first and second contact terminals provide opposite spring contact forces on the first and second conductive elements.

Specifically, there is disclosed herein a pair of contacts mounted on a rotatable cord reel chassis. The contacts ride or float on respective fixed contact disks which are in direct electrical contact to fixed cord reel terminals. The fixed contact disks are maintained in a spaced parallel relation by an insulating spacer member formed of a dielectric material and placed on a hub which rotatably mounts the reel. The contact disk pair is resiliently suspended between the contacts, resulting from a permitted tolerance or draft between the disks and the hub. As a result, an equal tension is maintained on each contact.

Owing to the above-described construction, the cord reel assembly provides greater convective and conductive heat dissipation due to large contact surface areas, and the ability of the contact disk assembly to realign itself regardless of cord reel chassis displacement due to the floating contact disk design.

Further features and advantages of the invention will readily be apparent from the specification and from the drawings.

BRIEF DESCRIPTION OF THE DRAWINGS

FIG. 3 is an axial side view of the cord reel assembly according to the invention removed from the vacuum cleaner;

FIG. 4 is a rear view of the cord reel assembly of FIG. 3;

FIG. 5 is a view similar to that of FIG. 3 with the support bracket removed for clarity;

FIG. 6 is a sectional view taken along the line 6—6 of FIG. 5 of a contact assembly according to one embodiment of the invention;

FIG. 7 is a plan view of a contact terminal of the contact assembly of FIG. 6;

FIG. 8 is a sectional view, similar to that of FIG. 6, for a contact assembly according to a first alternative embodiment of the invention;

FIG. 9 is a plan view of a contact terminal of the contact assembly of FIG. 8;

FIG. 10 is a sectional view, similar to that of FIG. 6, for a contact assembly according to a second alternative embodiment of the invention;

FIG. 11 is a plan view of a contact terminal of the contact assembly of FIG. 10;

FIG. 12 is a sectional view, similar to that of FIG. 6, for a contact assembly according to a third alternative embodiment of the invention;

FIG. 13 is a plan view of a contact terminal of the contact assembly of FIG. 12;

FIG. 14 is a plan view of a contact disk according to the invention with a terminal formed therein;

FIG. 15 is a side view of the contact disk of FIG. 14, with the terminal bent outwardly.

DESCRIPTION OF THE INVENTION

Figure 1:
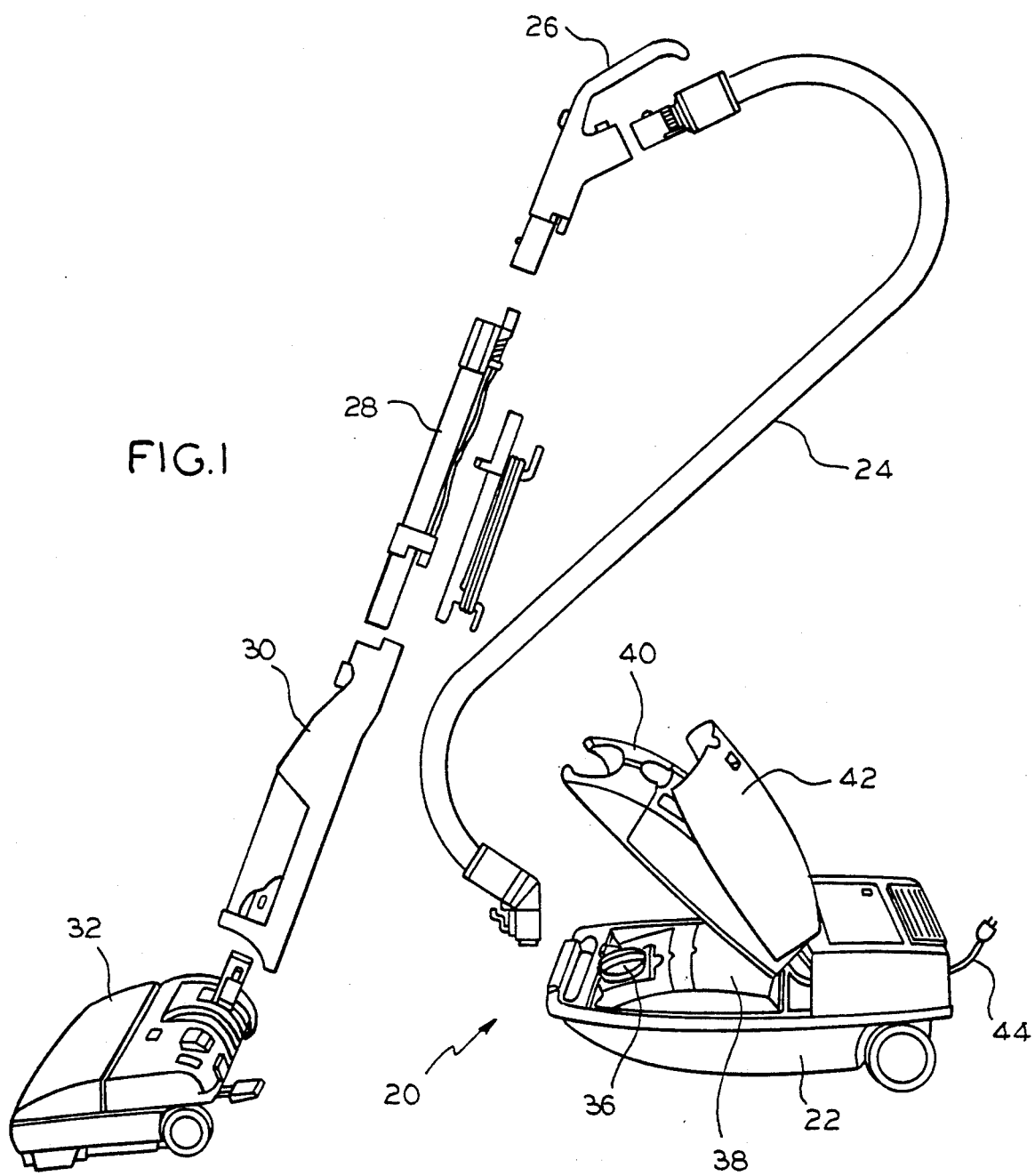
FIG. 1 is a partially exploded perspective view of a vacuum cleaner including the cord reel assembly according to the invention.

Referring to FIG. 1, a vacuum cleaner 20 including a cord reel assembly according to the invention is illustrated. The vacuum cleaner 20 comprises a canister-type vacuum cleaner. Although the description herein relates to such a vacuum cleaner, the cord reel assembly according to the invention could be used in connection with other types of vacuum cleaners as is obvious to those skilled in the art.

Figure 2:
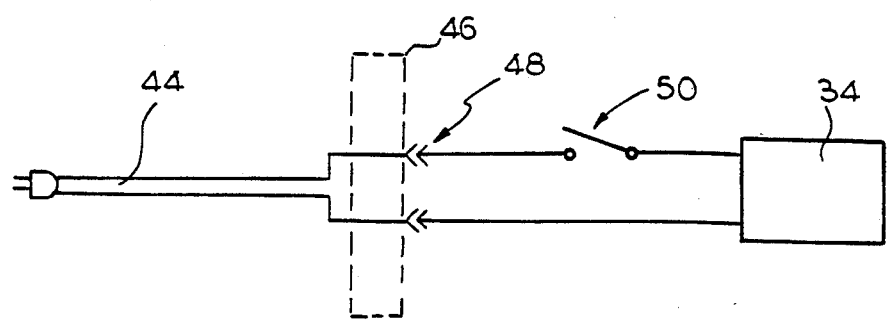
FIG. 2 is an electrical schematic diagram illustrating the electrical connections in the vacuum cleaner of FIG. 1.

The vacuum cleaner 20 includes a canister 22 connected through a hose 24 to a handle assembly 26. The handle assembly 26 is connected through a wand 28 and a dust cup assembly 30 to a floor engaging nozzle portion 32. With reference also to FIG. 2, the canister 22 houses various electrical apparatus 34, including a motor (not shown), which develops vacuum pressure at an opening 36 to draw dust and debris into a dust bag 38, as is well known. The canister includes a canister hood 40 for mounting attachments, and a cover 42 for enclosing such attachments.

Power to the electrical apparatus 34 is received from a power cord 44 which may be plugged into any electrical outlet in a conventional manner. The power cord 44 is wound on a cord reel, illustrated schematically at 46, located within the canister 22 and is connected through a contact assembly 48 and an on/off switch 50 to the electrical apparatus 34. The on/off switch 50 may be located on the canister 22 itself, as is shown in FIG. 2, or on the handle portion 26 (utilizing an electrical circuit not shown), as desired.

The cord reel 46 is rotatable, while the electrical apparatus 34 is fixedly mounted in the canister 22. It is therefore necessary to deliver power between a rotating body and a fixed body.

With reference to FIGS. 3-5, a cord reel assembly 52 includes a contact assembly 90 according to the invention.

The cord reel assembly 52 includes a support bracket 54 and a cord reel 56. The support bracket 54 includes opposite left and right L-shaped brackets 58 and 60 resiliently connected as at 62. The left bracket 58 is integrally molded with a circular cover 64 for concealing the contact assembly 90. The circular cover 64 includes a central aperture 66 for fastening the bracket 58 to a hub 68, using a fastener 69, to rotatably supports the reel 56. A pair of opposite rectangular slots 70 and 72 are provided on opposite lateral sides of the opening 66. Respective electrical terminals 74 and 76 extend through the openings 70 and 72. The electrical terminals 74 and 76 are used for connecting using suitable conductors to electrical apparatus in the vacuum cleaner for operating the same.

The right bracket 60 includes a central opening (not shown) receiving an expandable locking end 78 of the hub 68. Each of the brackets 58 and 60 includes a pair of locking members 80 for mounting the same within the canister 22. Finally, the right bracket 60 includes a release mechanism 82 for controlling movement of the cord reel 56 in a conventional manner.

The cord reel 56 comprises a chassis 84 defining an outer cylinder for carrying the cord between opposite annular side walls 86 and 88. The chassis 84 is rotatably mounted on the hub 68 and supports the contact assembly 90. The contact assembly 90 provides electrical connections to deliver power between the cord 44 and the terminals 74 and 76, as described below.

With reference also to FIG. 6, the contact assembly 90 comprises a pair of conductive elements in the form of contact disks 92 and 94, each having an inner face and an outer face. The disks 92 and 94 are resiliently mounted on the hub 68 using a spider or carrier 96 and are connected to the respective output terminals 74 and 76. The spider 96 is an insulated spacer which maintains the disks 92 and 94 in fixed, axially spaced relationship about a hub axis represented by a line 97. The spider 96 is loosely received on the hub 68 so that the contact disks 92 and 94 together are floating on the hub 68.

As illustrated in FIG. 14, the contact disk 92 is circular in shape and includes a pair of opposite, somewhat semicircular openings 98 and 100 connected by a slot 102 to form an enlarged annular ring 104 connected to a tab 106. With reference also to FIG. 15, the tab 106 is bent upwardly at a 90° angle to form the electrical output terminal 74, providing a circular opening 108 inside the ring 104. With particular reference to FIGS. 5 and 6, the spider 96 extends through the opening 108 and includes circumferentially spaced locking tabs 110 at either side for fixedly supporting the contacts disks 92 and 94 relative to one another.

Although not shown specifically, the second contact disk 94 is identical in construction to the first contact disk 92.

The contact assembly 90 further includes a pair of resilient contact terminals 112 and 114. The contact terminals 112 and 114 are identical in construction. With reference also to FIG. 7 the first contact terminal is illustrated in detail.

Figure 16:
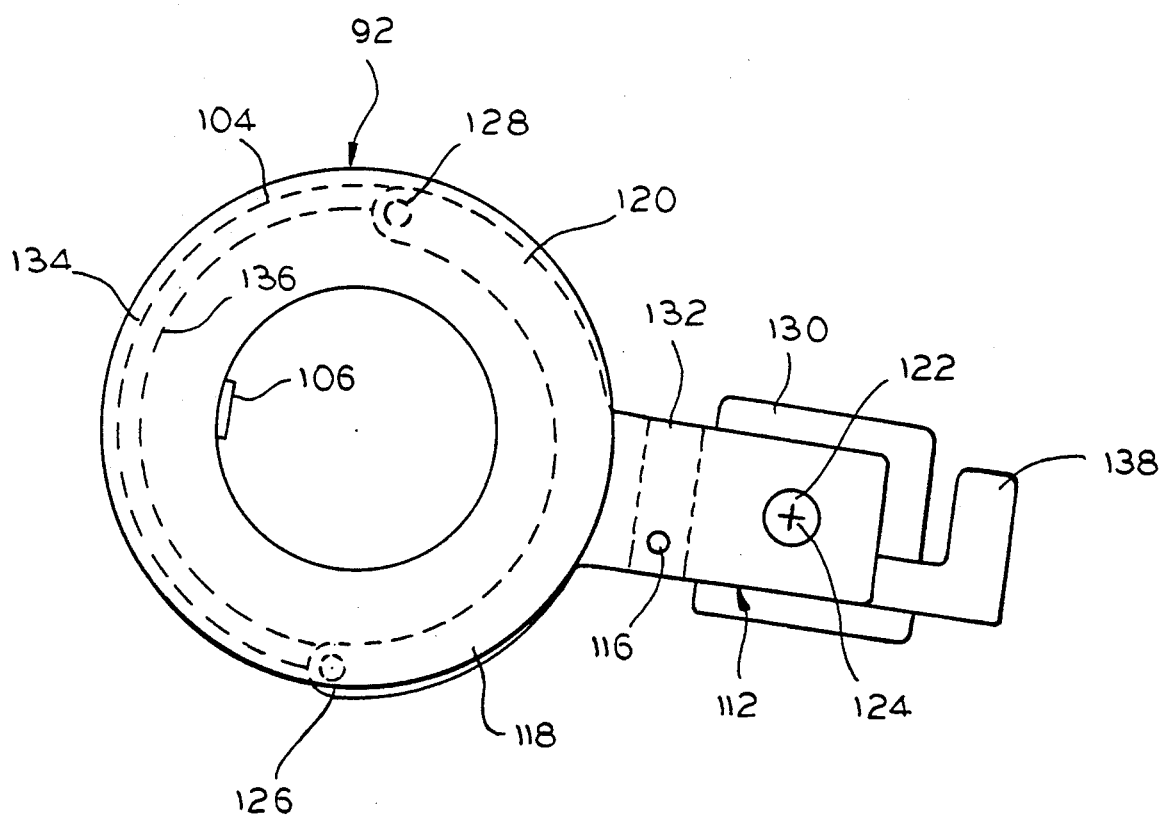
FIG. 16 is an enlarged view illustrating the contact made between the contact disk and the contact terminal in the embodiment of FIG. 6.

The contact terminal 112 is generally Y-shaped and includes a leg 116 connecting arms 118 and 120. The leg 116 includes an aperture 122 for securing the contact terminal 112 to the chassis 84 using a fastener, such as a screw 124, see FIG. 5. Each leg 118 and 120 includes a respective contact pad 126 and 128 formed thereon for contacting the disk 92, as discussed below. With reference also to FIG. 16, the screw 124 secures the contact terminal 112 to a boss 130 molded on the chassis 84. The leg 116 is bent at a jog portion 132 so that it extends below the first disk 92. As a result, the legs 118 and 120 are generally parallel to the disk 92 with the contact pads 126 and 128 contacting the disk ring 104. As a result, two points of electrical contact are made between the contact terminal 112 and the disk 92. Moreover, the leg 116 is fastened so that it is offset from a parallel radius of the disk 92. As a result, the first contact pad 126 is in contact with an outer concentric contact path, represented by a first dashed line 134, and the second contact pad 128 is in contact with an inner concentric contact path, represented by a dashed line 136. This provides dual contact tracks to improve reliability.

An electrical spade terminal 138 is electrically connected to the leg 112. Specifically, the terminal 138 may be integral with the leg 112, or may be a separate terminal which is in facial contact with the leg 112 and is secured thereto by the screw 124. The spade terminal 138 receives a connector 140 crimped to a first connector 142 of the power cord 44.

Although not specifically described herein, a similar relationship is provided between the second contact disk 94 and contact terminal 114 which is connected to the second conductor 144, the only difference being that the contact terminal 114 is turned 120° so that it is bent outwardly.

As shown schematically in FIG. 6, the contact disk assembly including the disks 92 and 94, and the spider 96, are sandwiched between the resilient contact terminals 112 and 114. In fact, the contact terminals 112 and 114 acts as springs to provide an equal and opposite force on both sides of the contact disks 92 and 94. As a result, any displacement variation of the chassis 84 relative to the hub 68, which initially causes a greater contact force on one disk 92 or 94, causes the hub 68 to realign due to such forces.

The use of contact disks 92 and 94 allows heat to be dissipated more easily due to the large surface area provided thereby compared to the narrower tracks in prior contact assemblies. This large surface area also permits use of multiple electrical contact tracks on the disks, as shown in FIG. 16 and discussed above relative thereto.

With reference to FIGS. 8 and 9, a contact assembly 90' according to a first alternative embodiment of the invention is illustrated. The contact assembly 90' includes contact disks 92' and 94', similar to those discussed above, except that the respective terminals 74 and 76 are turned at less than a right angle. A spacer 96' mounts the disks 92' and 94' to the hub 68 so that they are parallel and axially spaced with respect to one another, but they are not perpendicular relative to the hub axis 97.

Contact terminals are provided in the form of wiper blades 112' and 114'. The wiper blades 112' and 114' are in electrical contact with a peripheral side edge surface of each of the respective disks 92' and 94'. Because the contact disks 92' and 94' are at an angle relative to the hub 68, dirt and dust and the like will be pushed off the wiper blades 112' and 114' as the cord reel is rotated.

With reference to FIGS. 10 and 11, a contact assembly 90'' according to a second alternative embodiment of the invention is illustrated. The contact assembly 90'' includes first and second contact disks 92 and 94, identical to those discussed above, supported in axially spaced relationship by an insulating spacer 96''. Electrical contact terminals 112'' and 114'', see FIG. 11, comprise a leg 116'' connected to an annular ring 118'' including four circumferentially spaced contact pads 126'' formed therein for contacting the disks 92 and 94. A pair of spring washers 146 are held between shoulders 148 and 150 in a hub 68'' and sandwich the contact disks 92 and 94 between the contact terminals 112'' and 114''. Alternatively, the terminals 112'' and 114'' could be mounted in a similar manner as are the terminals 112 and 114, see FIG. 6.

With reference to FIGS. 12 and 13, a contact assembly 90''' according to a third alternative embodiment of the invention is illustrated. The contact assembly 90''' includes contact disks 92 and 94, identical to those discussed above, carried on the hub 68. Contact terminals 112'''' and 114'''', see FIG. 13, comprise elongated, bifurcated contacts consisting of a leg portion 116''' connected to two upwardly extending arms 118''' and 120''' having respective contact pads 126''' and 128''' formed therein. As illustrated in FIG. 12, one leg 118''' is bent downwardly, while the other leg 120''' is bent upwardly. As a result, the first arm 118''' contacts an outer face of the contact disk 92, while the second arm 120''' contacts an inner face of the contact disk 92. By sandwiching the contact disk 92 between the arms 118''' and 120''' it is not necessary to have a spacer. Instead, the contact terminal 112''' maintains the axial positioning of the contact disks 92 in floating arrangement on the hub 68 and in the necessary parallel, axially spaced relationship with the second contact disk 94, as provided by the second contact terminal 114''' in a similar manner.

Thus, the invention comprehends an improved electrical connection between a rotating element in the form of the cord 44 wound on the reel 56 and the contact terminals 74 and 76 fixedly mounted in the canister housing 22 owing to fixed, i.e., non-rotational, mounting via the spacer 96 to the hub 68.

The foregoing description of the invention is illustrative of the broad inventive concepts comprehended by the invention.

We claim:

1. A vacuum cleaner cord reel assembly comprising:
   a support bracket fixedly mounted in a vacuum cleaner housing;
   a cord reel rotatably supported on said support bracket about a rotational axis and carrying a two conductor electrical cord wound thereon for supplying power to the vacuum cleaner;
   first and second planar conductive elements including output terminals for connection to electrical apparatus in said housing;
   means for mounting said conductive elements to said support bracket in axially spaced relationship with one another, wherein said conductive elements are non-perpendicular to said rotational axis;
   first and second contact terminals electrically connected to said two conductors; and
   means for fixedly securing said contact terminals to said cord reel so that said first and second contact terminals are in electrical contact with said first and second conductive elements, respectively, incident to said cord reel being supported on said support bracket.

2. The vacuum cleaner cord reel assembly of claim 1 wherein said conductive elements are parallel to one another.

3. The vacuum cleaner cord reel assembly of claim 1 wherein each said contact terminal includes two contact pads in electrical contact with its respective conductive elements.

4. The vacuum cleaner cord reel assembly of claim 1 wherein said conductive elements comprise circular disks.

5. A vacuum cleaner cord reel assembly comprising:
a support bracket fixedly mounted in a vacuum cleaner housing;
a cord reel rotatably supported on said support bracket about a rotational axis and carrying a two conductor electrical cord wound thereon for supplying power to the vacuum cleaner;
first and second planar conductive elements including output terminals for connection to electrical apparatus in said housing;
means for mounting said conductive elements to said support bracket in axially spaced relationship with one another;
first and second contact terminals electrically connected to said two conductors, each said contact terminal including two contact pads in electrical contact with its respective conductive element, wherein each said contact terminal is radially offset relative to its respective conductive element to provide two concentric contact paths thereon; and
means for fixedly securing said contact terminals to said cord reel so that said first and second contact terminals are in electrical contact with said first and second conductive elements, respectively, incident to said cord reel being supported on said support bracket.

6. A vacuum cleaner cord reel assembly comprising:
a support bracket fixedly mounted in a vacuum cleaner housing;
a cord reel rotatably supported on said support bracket about a rotational axis and carrying a two conductor electrical cord wound thereon for supplying power to the vacuum cleaner;
first and second planar conductive elements including output terminals for connection to electrical apparatus in said housing, wherein each said conductive element comprises an annular disk including an outwardly bent terminal tab defining said output terminal;
means for mounting said conductive elements to said support bracket in axially spaced relationship with one another;
first and second contact terminals electrically connected to said two conductors; and
means for fixedly securing said contact terminals to said cord reel so that said first and second contact terminals are in electrical contact with said first and second conductive elements, respectively, incident to said cord reel being supported on said support bracket.

7. A vacuum cleaner cord reel assembly comprising:
a support bracket fixedly mounted in a vacuum cleaner housing;
a support bracket fixedly mounted inn a vacuum cleaner housing;
a cord reel rotatably supported on said support bracket about a rotational axis and carrying a two conductor electrical cord wound thereon for supplying power to the vacuum cleaner;
first and second planar conductive elements including output terminals for connection to electrical apparatus in said housing;
means for mounting said conductive elements to said support bracket in axially spaced relationship with one another;
first and second contact terminals electrically connected to said two conductors; and
means for fixedly securing said contact terminals to said cord reel so that said first and second contact terminals are in electrical contact with a peripheral edge surface of said first and second conductive elements, respectively, incident to said cord reel being supported on said support bracket.

8. A vacuum cleaner cord reel assembly comprising:
a support bracket fixedly mounted in a vacuum cleaner housing;
a cord reel rotatably supported on said support bracket about a rotational axis and carrying a two conductor electrical cord wound thereon for supplying power to the vacuum cleaner;
first and second planar conductive elements including output terminals for connection to electrical apparatus inn said housing;
means for mounting said conductive elements to said support bracket in axially spaced relationship with one another;
first and second contact terminals electrically connected to said two conductors; and
means for fixedly securing said contact terminals to said cord reel so that said first and second contact terminals are in electrical contact with two planar surfaces of said first and second conductive elements, respectively, incident to said cord reel being supported on said support bracket.

9. A contact assembly for a power cord in a vacuum cleaner comprising:
a hub in fixed relationship with said vacuum cleaner;
a pair of contact disks each having an inner and an outer face and a contact disk terminal;
means for resiliently mounting said disks on said hub with their respective inner faces in a spaced parallel relationship and said contact disk terminals in fixed relationship with said vacuum cleaner for connection to electrical apparatus therein;
a cord reel carrying said power cord and having a chassis rotatably mounted on said hub about a rotational axis; and
a pair of resilient contacts electrically connected to said power cord and secured to said cord reel chassis, each of said contacts contacting one of said contact disks for providing electrical power to said vacuum cleaner.

10. The contact assembly of claim 9 wherein said pair of contact disks is axially movable relative to said hub.

11. The contact assembly of claim 9 wherein said contact disks are perpendicular to said rotational axis.

12. The contact assembly of claim 9 wherein said contact disks are non-perpendicular to said rotational axis.

13. The contact assembly of claim 9 wherein said resilient contacts are mounted in fixed relationship relative to one another.

14. The contact assembly of claim 9 wherein each said resilient contact includes two contact pads in electrical contact with its respective contact disk.

15. The contact assembly of claim 14 wherein each said resilient contact is radially offset relative to its respective contact disk to provide two concentric contact paths thereon.

16. The contact assembly of claim 9 wherein said mounting means comprises an insulating spacer disposed between said contact disks on said hub.

17. The contact assembly of claim 9 wherein each said contact disk comprises an annular disk including an outwardly bent terminal tab defining said contact disk terminal.

18. The contact assembly of claim 9 wherein each said resilient contact contacts a peripheral edge surface of its respective contact disk.

19. The contact assembly of claim 9 wherein each said resilient contact contacts the outer face of its respective contact disk.

20. The contact assembly of claim 9 wherein each said resilient contact contacts both the inner and outer face of its respective contact disk.

21. The contact assembly of claim 9 wherein said said resilient contacts provide opposite spring contact forces on said contact disks.

* * * * *